(12) United States Patent
Wilhelmi (10) Patent No.: US 11,147,208 B2
(45) Date of Patent: Oct. 19, 2021

(54) SEED DRILL WITH ELECTRIC METERING SYSTEM (71) Applicant: Kinze Manufacturing, Inc., Williamsburg, IA (US)

(72) Inventor: Matthew Wilhelmi, Williamsburg, IA (US)

(73) Assignee: Kinze Manufacturing, Inc., Williamsburg, IA (US)

( * ) Notice: Subject to any disclaimer, the term of this patent is extended or adjusted under 35 U.S.C. 154(b) by 248 days.

(21) Appl. No.: 16/408,580

(22) Filed: May 10, 2019

(65) Prior Publication Data

US 2019/0343038 A1    Nov. 14, 2019

Related U.S. Application Data (60) Provisional application No. 62/670,083, filed on May 11, 2018.

(51) Int. Cl.
*A01C 7/10* (2006.01)
*A01C 7/20* (2006.01)
*A01C 7/08* (2006.01)
*A01C 7/04* (2006.01)

(52) U.S. Cl.
CPC ............. *A01C 7/105* (2013.01); *A01C 7/042* (2013.01); *A01C 7/082* (2013.01); *A01C 7/203* (2013.01)

(58) Field of Classification Search
CPC ......... A01C 7/105; A01C 7/042; A01C 7/082; A01C 7/203; A01C 7/102; A01C 7/10; A01C 7/08; A01C 7/04; A01C 7/00; A01C 7/201; A01C 7/20
See application file for complete search history.

(56) References Cited

U.S. PATENT DOCUMENTS

| 2005/0140327 | A1* | 6/2005 | Carolan | H02P 8/34 318/696 |
| 2008/0047475 | A1* | 2/2008 | Stehling | A01C 7/081 111/69 |
| 2015/0059627 | A1 | 3/2015 | Kinzenbaw et al. | |

* cited by examiner

*Primary Examiner* — Christopher J. Novosad
(74) *Attorney, Agent, or Firm* — McKee, Voorhees & Sease, PLC (57) ABSTRACT An agricultural planting implement is used to plant seed in a field. The implement includes an electrically-driven seed meter that is spaced on a toolbar of the implement. The seed meter, or other metering member, is a precision meter that is used to control the volume, spacing, and location of a seed that is delivered from a meter to the field. A seed source, such as a seed cart or hopper, is attached to the seed meters to provide an on-demand amount of seed to the meters for planting in the field.

20 Claims, 6 Drawing Sheets

SEED DRILL WITH ELECTRIC METERING SYSTEM

CROSS REFERENCE TO RELATED APPLICATIONS

This application claims priority under 35 U.S.C. § 119 to provisional application U.S. Ser. No. 62/670,083, filed May 11, 2018. The provisional patent application is herein incorporated by reference in its entirety, including without limitation, the specification, claims, and abstract, as well as any figures, tables, appendices, or drawings thereof.

FIELD OF THE INVENTION

The invention relates generally to agricultural implements. More particularly, but not exclusively, the invention relates to the use of one or more electronically controlled seed metering systems in combination with a seed drill to control the meter and dispensement rate of seed from the meter.

BACKGROUND OF THE INVENTION

A seed drill is a device that sows the seeds for crops by metering out the individual seeds, positioning them in the soil, and covering them to a certain average depth. The seed drill sows the seeds at equal distances and proper depth, ensuring that the seeds get covered with soil and into moisture for a rooting environment, with the added benefit that the seeds are saved from being eaten by birds. Before the introduction of the seed drill, a common practice was to plant seeds by hand. Besides being wasteful, planting was usually imprecise and led to a poor distribution of seeds, leading to low productivity.

Seed drilling includes a plurality of spaced furrow openers to open furrows in the field. The openers operate to maintain planting at a desired depth. Closing wheels follow the openers and close the furrow once seed is introduced. Seed drills are ideal for certain types of seed, including, but not limited to, soybeans, canola, peas, legumes, corn, wheat, barley, etc.

Traditionally, a seed drill used to consist of a hopper filled with seeds arranged above a series of tubes that can be set at selected distances from each other to allow optimum growth of the resulting plants. Seeds are spaced out using fluted paddles which rotate using a geared drive from one of the drill's land wheels—seed rate is altered by changing gear ratios. Most modern drills use air to convey seed in plastic tubes from the seed hopper to the coulters. The seed is metered mechanically into an air stream created by a hydraulically powered on-board fan and conveyed initially to a distribution head which sub-divides the seed into the pipes taking the seed to the individual coulters.

However, the mechanical metering and use of air in the manner of traditional seed drilling has faults. For example, it is difficult to control the population of seeds being planted at each furrow. The inconsistency can be increased by the inability to control the flow at each furrow location. The amount of seeds dispersed per second (see, e.g., FIG. 4), at each furrow location, can vary by as much as 40% over time. Therefore, there is no row to row population consistency. Furthermore, as the system is essentially an on/off system that uses air to move the seed through the system and to the furrow, geographical features of fields can further increase the inefficiencies. Hills, turns, and the like, can cause even greater variance in the application of seed.

Still further, as the drills utilize air, it is difficult if not impossible to monitor the application of the seeds, such as by sensors.

Therefore, there is a need in the art for an improved seed drill that provides for controlled delivery of seed to a furrow, and also for a way to monitor the amount of seed being delivered.

SUMMARY OF THE INVENTION

Therefore, it is a principal object, feature, and/or advantage of the disclosed features to overcome the deficiencies in the art.

It is another object, feature, and/or advantage of the invention to provide consistent population control across rows of a planting apparatus.

It is yet another object, feature, and/or advantage of the invention to mitigate effect on planting population due to changing elevation, e.g., hills.

It is still another object, feature, and/or advantage of the invention to provide swath control for a planting apparatus.

It is a further object, feature, and/or advantage of the invention to provide singulation of seed and/or to replace volumetric dispensing of seed from a metering member.

It is yet a further object, feature, and/or advantage of the invention to include seed sensing for the metering of seeds in a seed drill.

It is still a further object, feature, and/or advantage of the invention to include turning compensation control for seed meters of a seed drill apparatus.

It is another object, feature, and/or advantage of the invention to provide more consistent and even seed distribution on a row-by-row basis of an implement including row units comprising seed drills.

These and/or other objects, features, and advantages of the disclosure will be apparent to those skilled in the art. The present invention is not to be limited to or by these objects, features and advantages. No single embodiment need provide each and every object, feature, or advantage.

It is still yet a further object, feature, or advantage of the present invention to provide an apparatus that is cost effective.

It is still yet a further object, feature, or advantage of the present invention to provide an apparatus that is reliable and durable and has a long usable life.

It is still yet a further object, feature, or advantage of the present invention to provide an apparatus which is easily used and reused.

It is still yet a further object, feature, or advantage of the present invention to provide an apparatus that is easily manufactured, assembled (installed), disassembled (uninstalled), repaired, replaced, stored, transported, and cleaned.

It is still yet a further object, feature, or advantage of the present invention to provide an apparatus that is aesthetically pleasing.

It is still yet a further object, feature, or advantage of the present invention to incorporate an apparatus into a system accomplishing some or all of the previously stated objectives.

These or other objects, features, and advantages of the present invention will be apparent to those skilled in the art after reviewing the following detailed description of the illustrated embodiments, accompanied by the attached drawings.

Various embodiments of the present disclosure illustrate several ways in which the present invention may be practiced. These embodiments will be described in detail with reference to the drawings, wherein like reference numerals represent like parts throughout the several views. Reference to specific embodiments does not limit the scope of the present disclosure and the drawings represented herein are presented for exemplary purposes.

DETAILED DESCRIPTION OF THE INVENTION

The following definitions and introductory matters are provided to facilitate an understanding of the present invention. Unless defined otherwise, all technical and scientific terms used herein have the same meaning as commonly understood by one of ordinary skill in the art to which embodiments of the present invention pertain.

The terms "a," "an," and "the" include plural referents unless context clearly indicates otherwise. Similarly, the word "or" is intended to include "and" unless context clearly indicate otherwise. The word "or" means any one member of a particular list and also includes any combination of members of that list.

The terms "invention" or "present invention" as used herein are not intended to refer to any single embodiment of the particular invention but encompass all possible embodiments as described in the specification and the claims.

The term "about" as used herein refers to variation in the numerical quantities that can occur, for example, through typical measuring techniques and equipment, with respect to any quantifiable variable, including, but not limited to, mass, volume, time, distance, wave length, frequency, voltage, current, and electromagnetic field. Further, given solid and liquid handling procedures used in the real world, there is certain inadvertent error and variation that is likely through differences in the manufacture, source, or purity of the ingredients used to make the compositions or carry out the methods and the like. The claims include equivalents to the quantities whether or not modified by the term "about."

The term "configured" describes an apparatus, system, or other structure that is constructed to perform or capable of performing a particular task or to adopt a particular configuration. The term "configured" can be used interchangeably with other similar phrases such as constructed, arranged, adapted, manufactured, and the like.

Terms such as first, second, vertical, horizontal, top, bottom, upper, lower, front, rear, end, sides, concave, convex, and the like, are referenced according to the views presented. These terms are used only for purposes of description and are not limiting unless these terms are expressly included in the claims. Orientation of an object or a combination of objects may change without departing from the scope of the invention.

The apparatuses, systems, and methods of the present invention may comprise, consist essentially of, or consist of the components of the present invention described herein. The term "consisting essentially of" means that the apparatuses, systems, and methods may include additional components or steps, but only if the additional components or steps do not materially alter the basic and novel characteristics of the claimed apparatuses, systems, and methods.

The following embodiments are described in sufficient detail to enable those skilled in the art to practice the invention however other embodiments may be utilized. Mechanical, procedural, and other changes may be made without departing from the spirit and scope of the invention. Accordingly, the scope of the invention is defined only by the appended claims, along with the full scope of equivalents to which such claims are entitled.

The present invention is related generally to the field of planting seed. More particularly, the invention relates to improvements in seed drills, which may also be referred to as air seed drills. As is known, air seed drills are used to plant certain types of seed in which population is desirable. The population control may be desirable for such seeds including, but not limited to, soybeans, canola, peas, legumes, wheat, barley, and the like. Additional types of seeds which are to be planted utilizing seed drills are to be included as part of the present disclosure. Because these types of seeds are generally planted on a population basis, the control of said population has been less than desirable. This variation may be caused by the inability to meter and/or monitor the amount of seed being dispensed at row units of a seed drill planter. Therefore, the invention includes aspects which are aimed to improve the population control of a seed drill for planting said seed.

Figure 1:
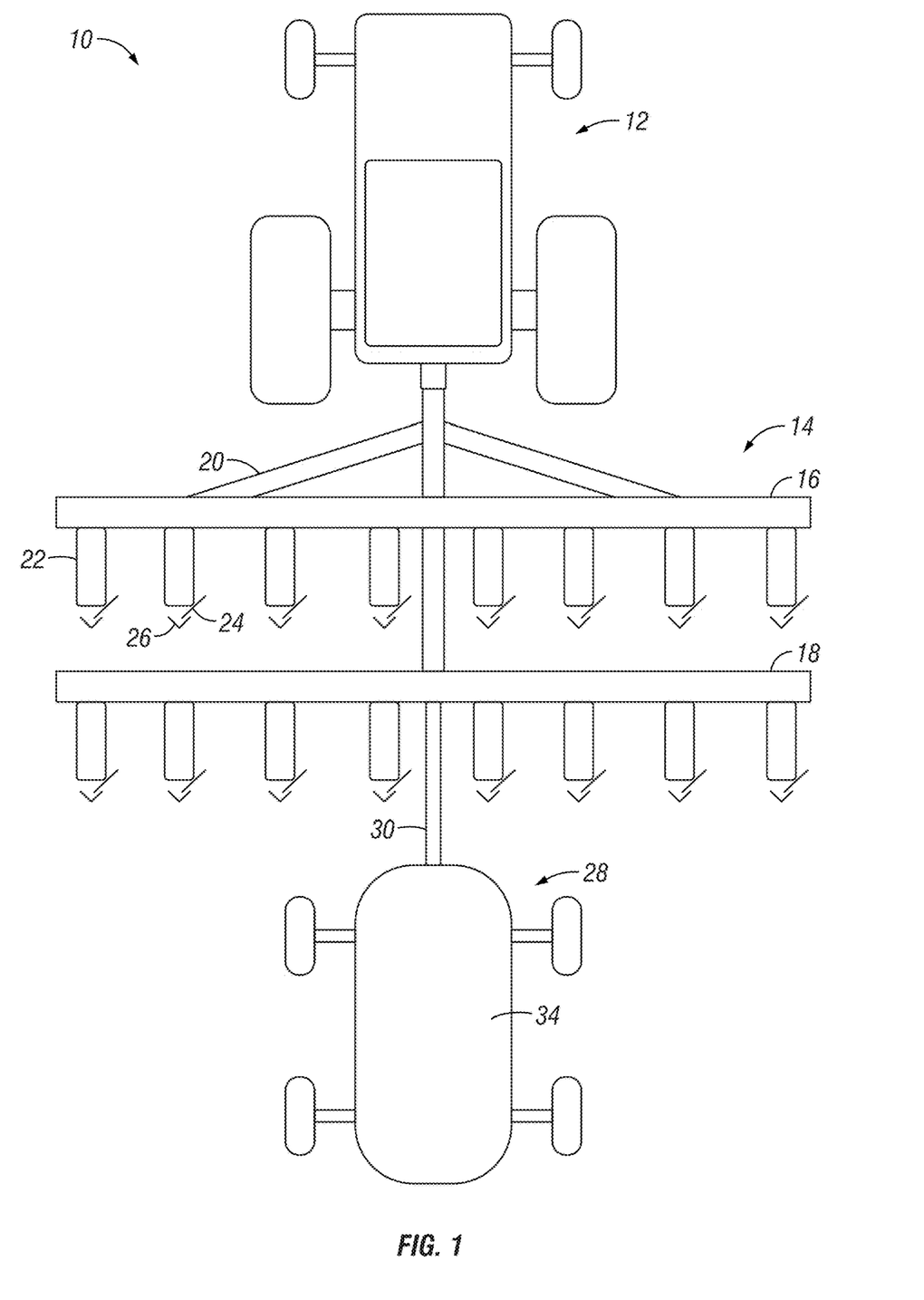
FIG. 1 is a schematic of an exemplary planting system that incorporates aspects of the invention.

Therefore, FIG. 1 shows an exemplary planting system 10. Components of the exemplary planting system 10 include a tractor 12, which may be referred to generically as a tow vehicle. The tractor 12 is connected to an implement 14, which is the towed vehicle. The implement 14 maybe be connected by a hitch or draft links 20. It should be contemplated and appreciated that the exact measure for attaching the tractor 12 to the implement 14 may not be limiting to the present disclosure, and generally any manner of connecting and towing an implement 14 via a tow vehicle is to be appreciated and considered part of the present disclosure. The implement 14 is shown to be a seed drill in FIG. 1. However, as will be understood, aspects of the invention can be utilized with generally any type of implement. This can include seed drills with first and second tool bars 16, 18, traditional planting tool bars, such as that shown and described in this U.S. Pat. No. 9,282,692, which is hereby incorporated by reference in its entirety, and also could be combined with other types of implements which may be non-traditional planting implements. For example, tillage equipment includes components which are used to till a field. This can include a number of disks, blades, or other tilling equipment. However, the tillage implements will still include tool bars from which the tillage components are attached. Therefore, as will be understood, the row units as described herein can be utilized and positioned on the tool bars of a tillage equipment to provide cover crop or other particles to a ground as the tillage implements is tilling the ground. Still further, it is to be contemplated that the row units and metering members of the present disclosure can be used with spraying or other fertilizer applying implements to provide additional seed or cover crops during the application of the fertilizer or other materials to the field.

However, as shown in FIG. 1, the implement 14 is a seed drill implement which includes a first tool bar 16 and a second tool bar 18. The first tool bar is positioned forward of the second tool bar 18. Positioned along each of the tool bars 16, 18 are a number of row units 22, which can include an opener 24 and a metering member 26. The openers create a furrow in the ground and the metering members are used to meter seed to dispense the seed from the row unit into the created furrow. A closing wheel or other device will then follow the row units to close the furrow, which is accomplishing the planting of the seed. As shown in the figure, the row units of the first and second tool bar 16, 18 are generally staggered such that they will not overlap upon each other.

Also shown in FIG. 1 is a seed cart 28 which is a source of seed for providing the row units with on-demand seed for planting. The seed cart of FIG. 1 as shown to be trailing the seed drill 14 and can be connected to each of the row units, such as by hose or other conduit to supply an on demand amount of seed at the row units as the system 10 moves through a field. Thus, the seed cart 28 can include a hopper or other holding apparatus 34 thereon. Furthermore, a hitch 30 can be utilized to connect the seed cart to the tool bar. However, it should also be contemplated and appreciated that a hopper, such as a bulk hopper be on the implement 14 itself, and/or the row units each include individual row hoppers. The hoppers on the tool bars and/or the row units will also be a seed source to supply an on-demand amount of seed to be planted by the row units. As will be understood, when a bulk hopper is used, even with the separate and trailing seed cart 28, an air seed delivery system, such as that shown and described in the U.S. Pat. No. 8,448,585, which is hereby incorporated in this reference could be utilized to provide the seed from the seed source to each of the row units on said on demand basis. Such an air seed delivery system can be utilized and can be automated to continuously provide the seed at the row units as needed through the field.

Figure 2:
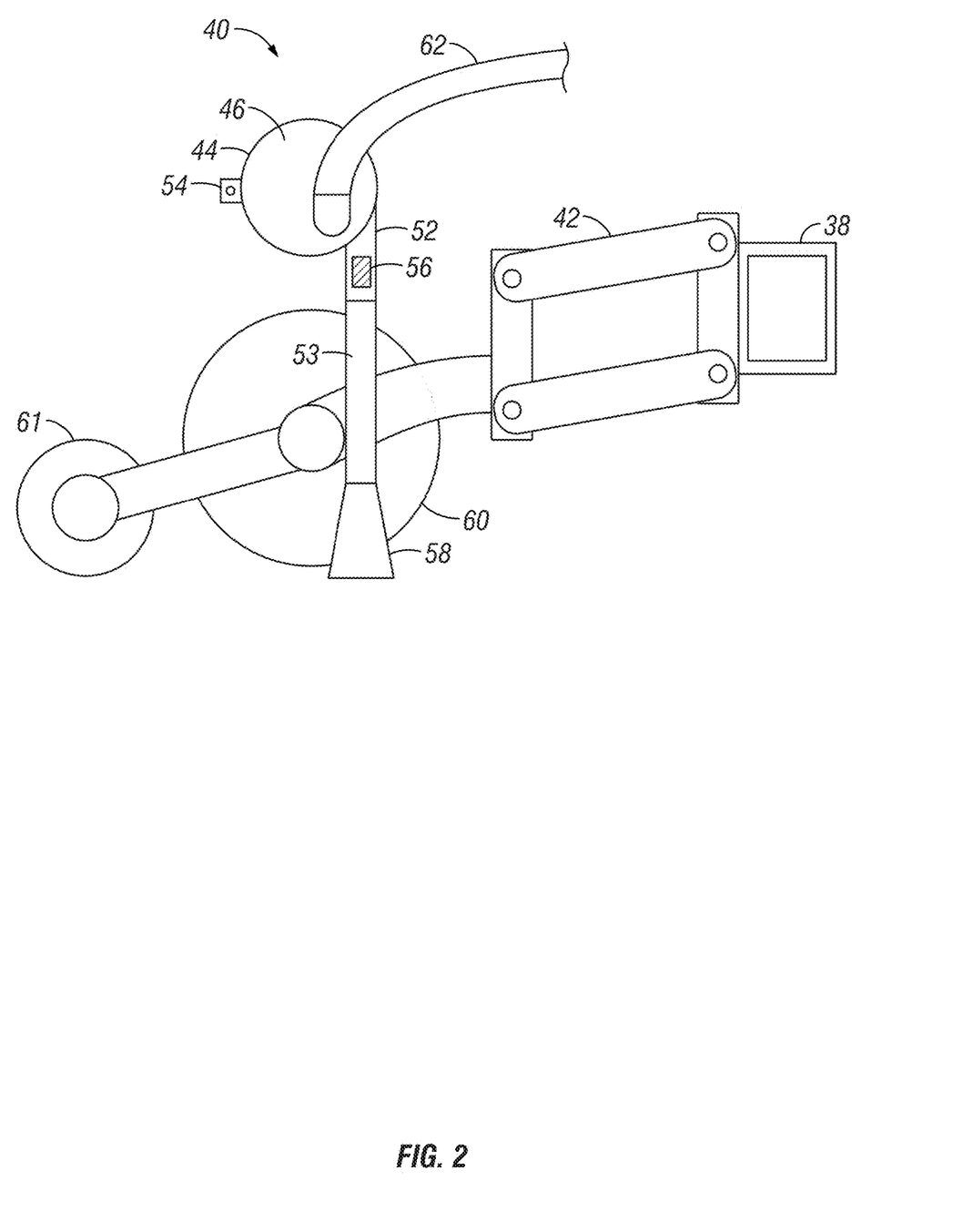
FIG. 2 is a schematic of an exemplary row unit including aspects of the invention.

FIG. 2 is an exemplary embodiment of a row unit for use with an implement according to aspects of the invention. As stated herein, traditional seed drills lack the ability to control population of seed being dispensed via the row units along the tool bars and on the implement itself. Therefore, the row unit of FIG. 2 provides improvements and novel aspects, which can provide for many advantages for seed drill planting. Such advantages can include, but are limited to, consistent row-to-row population control, mitigation of effect on population due to change in elevation, swath control, singulation of crops/seeds, row-by-row seed sensing and/or monitoring, turning compensation, and/or row-by-row variable rate and consistent seed delivery of the seed at each of the row units. As will be understood, the additional controls and monitoring of the components of the row unit 40 shown in FIG. 2 will greatly reduce and/or eliminate waste of materials, such as seed, and can also increase the yield potential of the planting apparatus.

Therefore, the row unit 40 shown in FIG. 2 includes components connected to a tool bar 38. The tool bar 38, for example, may be either of the tool bars 16, 18, as shown in the implement 14 of FIG. 1. In addition, the tool bar 38 shown in FIG. 2 can also be a standard tool bar, such as used with a traditional corn planter which utilizes higher levels of singulation and precision planting, as is known. Connected to the tool bar 38 is a linkage 42 which includes upper and lower linkage arms to allow for some movements of the row unit 40 relative to the tool bar 38. This allows for movement based on changes of elevation, including obstructions, as the row unit and implement moves through the field. A frame connects the linkage to the rest of the row unit components. For example, a seed meter 44 is included on each of the row units. The seed meter includes seed meter housing 46, which can include a metering member 48. The meter member is generally a device, such as a seed disk, which is rotatable within the meter housing 46 and which will meter the seed supplied to the meter housing 44 and singulate the seed attached or otherwise associated with the metering number to a location wherein the seed is released from the metering member towards the furrow. As will be understood, such examples of metering members include, but are not limited to brush meters, vacuum meters, positive pressure meters, mechanical meters, finger meters, and/or generally any combination while other type of meter member associated with finding seeds. Seed can be supplied to the meter housing 46, such as that shown in FIG. 2, by a hose 62 which may be part of the air seed delivery system as previously disclosed. The seed can accumulate at a seed pool and/or reservoir of the meter housing 44 where it will be picked up or otherwise associated with the metering member 48 thereof. The metering member can then rotate to singulate the seed associated with the metering member and take to a location where it will release the seed towards the furrow. Such a location may be at or near a seed chute 52 which is a neck like member which extends at least partially downward from the meter housing 44. The seed chute can direct the seed released from the meter member towards and/or into a seed tube 53 which is a gravity type member to direct seed towards a furrow created in the ground. The furrow can be created by an opener 60 and/or a seed chute 58. For example, the opener 60 could include one or more opening disks to create a furrow in the ground, or could comprise a seed shoe 58 which is used to create a furrow in the ground. The seed tube 53 will be associated and positioned generally adjacent the opening mechanisms such that seed passing through and out of the seed tube 53 will be positioned in the furrow. After the seed is located in the furrow, a closing mechanism 61, such as a closing wheel, will be used to enclose the furrow about the seed that has been positioned therein.

Additional aspects of the row unit include the use of an electric motor 54 for operating the metering member 48 within the seed meter housing 46. The electric motor can be operably connected, such as connected in a manner shown in co-owned U.S. Pat. No. 9,282,692, which is hereby incorporated by reference in its entirety. However, the manner of operation of the electric motor and the metering member should not be limited to that which is disclosed in the '692 patent. The electric control of the metering member will provide numerous advantages, which can include, but are not limited to, the ability to control the amount, i.e., the population of seed being planted via the meter 44. This can be controlled by mechanisms such as the rotation of velocity of the metering member in the meter 44. The use of different seed disks with having different seed cells and/or pockets can also aid in controlling the population of seed being dispensed by the seed meter 44 of a particular row unit 40. Still further, as each meter 44 of each row unit 40 on an implement is electrically controlled, this will allow for individual control of the population being planted at each location of a row unit. For example, there may be instances where certain locations on a field need to be planted, wherein said locations are associated with a particular row unit. However, locations of additional row units may not be desirable for planting, for any number of reasons. The use of the electrically controlled meter with the seed drill planting system will allow for the selective planting at each location, which will aid in saving the seed, which eliminates waste, and which increases yield potential throughout the field. This also is beneficial with regard to turning compensation, wherein an implement is turning and row units and thus seed meters at an outer location of the turn radius or arc will need to be operating at a higher disk rotational speed than that of row units and seed meters at an inner position with regard to arc of the turn. The individual control of the electric motor will allow and provide for such control, which again will control the amount of seed population being planted by the seed drill.

Additional aspects of the row unit and seed meter include the use of one or more sensors 56. As shown in FIG. 2, the sensor is shown on the seed chute 52 of the meter 44. Such a configuration is generally shown and described in U.S. Pat. No. 8,843,281, which is co-owned and herein incorporated are referenced in its entirety and for all purposes. As disclosed in the '281 patent, the sensor will aid in monitoring and providing information and data related to the number of seeds passing through the seed chute 52. This will provide a more accurate reading to an operator of the planting system to control the operation of the meter 44, such as by controlling the electrical motor 54 to either increase or decrease in order to increase or decrease the population of seed being dispensed therefrom and thus planted in a field.

Figure 3:
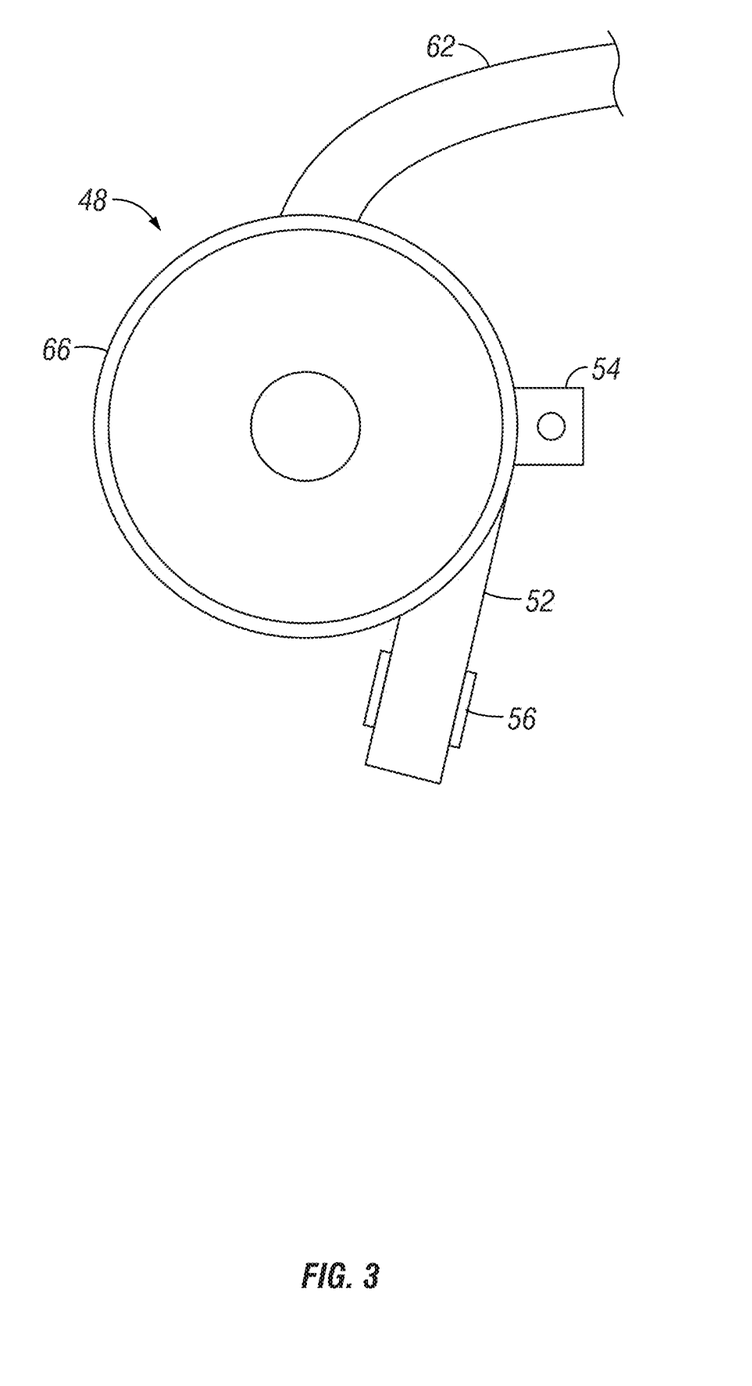
FIG. 3 is a schematic of an exemplary metering member according to aspects of the invention.
Figure 4:
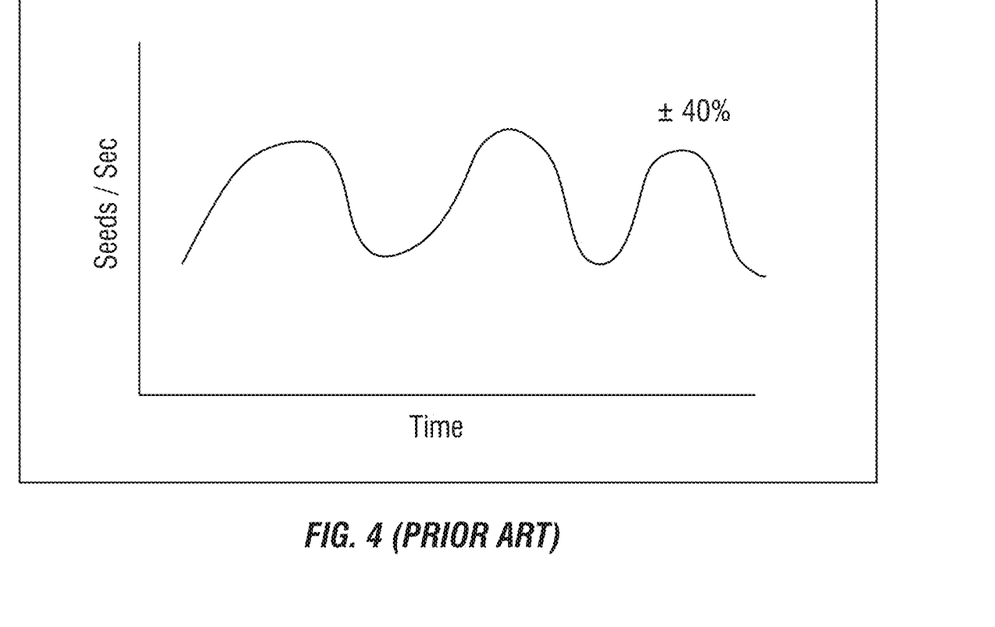
FIG. 4 is a graph showing variance of seeding population based upon prior art systems, methods, and/or apparatus.
Figure 5:
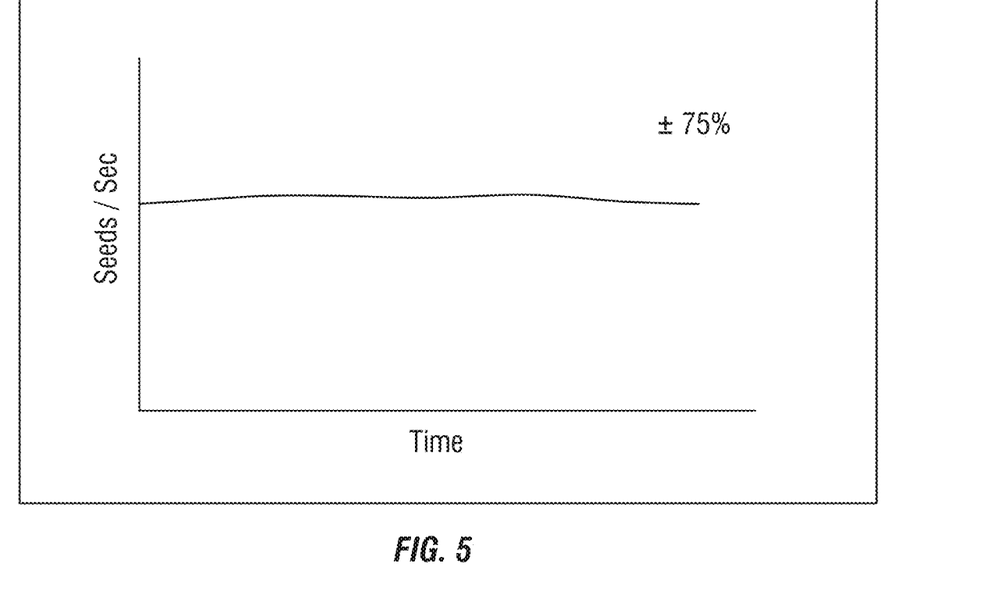
FIG. 5 is a graph showing exemplary data of seeding population variance over time according to systems, methods, and/or apparatus incorporating the invention of the present disclosure.
Figure 6:
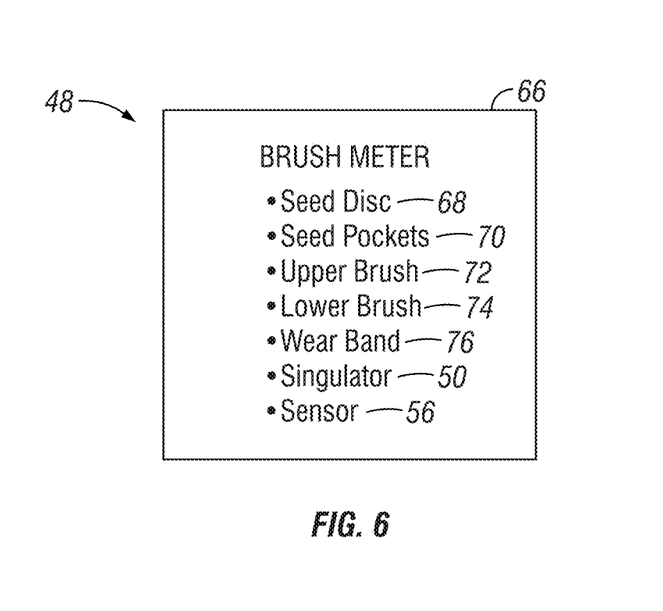
FIG. 6 is a diagram of an exemplary brush meter style seed meter.

FIG. 3 is an enlarged view of a seed meter 44 and metering member 48 according to aspects of the invention. As shown in FIG. 3, the metering member 48 may be a brushed type singulating meter 66. A brushed type singulate seed meter includes a brush to singulate the amount of seed held in pockets of a seed disk during rotation of the seed disk in order to control the number and population of seed being dispensed via the seed chute 52 and towards a furrow. Therefore, the inclusion of an electric motor 54 connected to the seed disk will aid in providing better control and more control to the amount and/or population of seed being dispensed, such as by controlling the rotational velocity of the disk, which will increase or decrease the amount seed being dispensed therefrom. FIG. 3 also shows the hose 62 for supplying seed to the meter as well as the center 56 being positioned generally at the seed chute 52 to provide monitoring to the system for aid in controlling the population of seed being dispensed therefrom. While the number of advantages of the improvements shown and described herein have been clearly annumerated, FIGS. 4 and 5 provides drafts which even further show the benefits of using aspects of the invention as disclosed herein. For example, FIG. 4 is a graph showing the population variance based on the seeds per second disbursement of a seed drill according to prior art style seed drills. As shown in the figure, over time, the seeds per second can vary greatly and can be plus or minus approximately 40% of a desired amount. This can be caused by many issues, which can include but are not limited to the inability to precisely control and meter amount of seed, changes and field conditions and/or elevation of a field, and the simplicity of traditional systems, which may include broadcast type planting in which the meters are generally either on or off regardless of the location and desirability of planting population.

Moving to FIG. 5, a graph is shown in which the output of a planting implement utilizing the invention is typified. As shown in FIG. 5, which is an exemplary graph, the seeds per second that is being dispensed from the meter on any particular row unit over time, includes minor to no variance. It is contemplated that the variance may be less than 5% of a desired amount of population of seed being planted over time. This can be accomplished, in part at least, based on the inclusion of an electric drive with a metering member that includes a singulating member that aids in controlling the amount of seed that is being dispensed from a meter at each of the row units of an implement. This control at such a micro level is a great improvement over the macro style of planting, which is been traditional with seed drills.

FIG. 6-9 are exemplary diagrams of types of meters which can be utilized with the electric drive for use with the invention on a row unit basis to provide for control of the seed population planting of seed drills. For example, FIG. 6 includes a depiction of a brush meter 66. The brush meter 66 includes a seed disk 68 with seed pocket 70, an upper brush 72, a lower brush 74, a wear band 76, a singulator 50 (optional), and a sensor 56. The upper brush 72 is utilized to singulate seed in the seed pocket 70 of the seed disk 68, as the disk rotates within the meter housing. The lower brush 74 is utilized to maintain a seed pool within the meter housing. The electric motor connected to the seed disk 68 will aid in controlling the population of the seed being planted as the implement moves through the field. The electric motor will also provide for independent control of each of the row units to provide for independent control and independent population control along the length of a tool bar of an implement.

Figure 7:
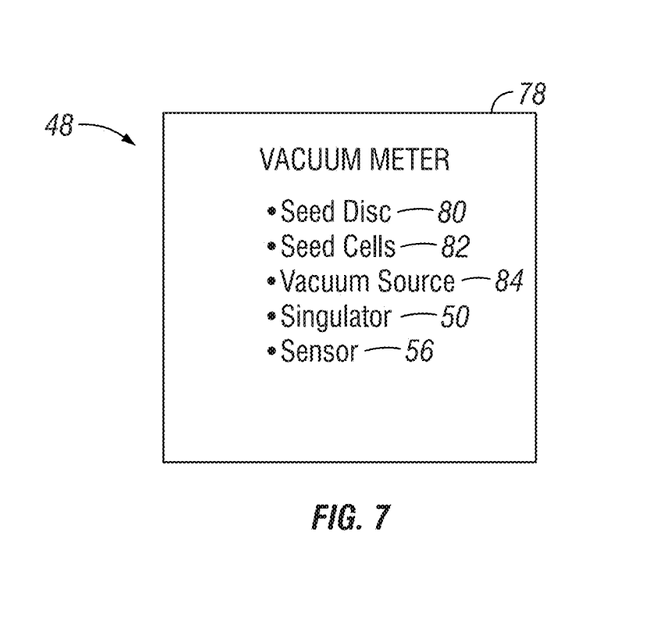
FIG. 7 is a diagram of an exemplary vacuum seed meter.

FIG. 7 is a metering member 48, which is an exemplary vacuum meter 78. A vacuum meter, such as that shown and described in U.S. Pat. No. 9,282,692, can include a seed disk 80 with a plurality of seed cells 82. A vacuum source is connected to the meter housing to provide a pressured inferential at the seed cells 82. A singulator 50 is included to control the number of seeds at the seed cells 82. A sensor 56 can be used to sense and monitor the population of seed being dispensed via the vacuum meter 78 and can provide for greater control thereof.

Figure 8:
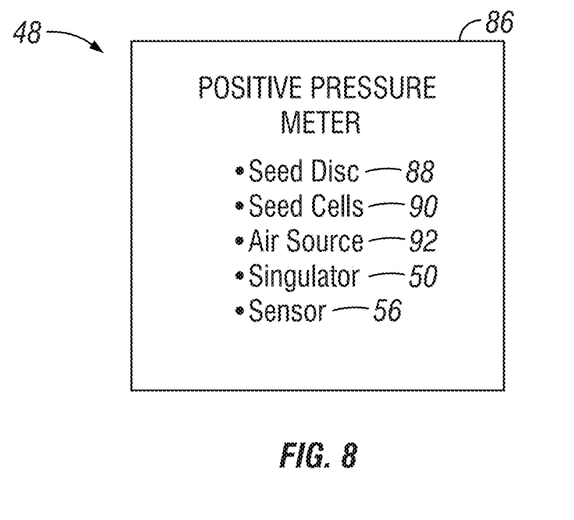
FIG. 8 is a diagram of an exemplary positive pressure seed meter.

FIG. 8 is a metering member 48, which may be known as a positive pressure meter 86. The positive pressure meter 86 is also shown and described in U.S. Pat. No. 9,282,692. Such a meter can include a seed disk 88 with a plurality of seed cells 90. An air source can be utilized to provide a positive pressure differential at the seed cells 92 hold seed thereat. A singulator 50 can be included to control the number of seeds at the seed cells, and a sensor 56 can be used to monitor and control the population of seed being dispensed from said meter.

Figure 9:
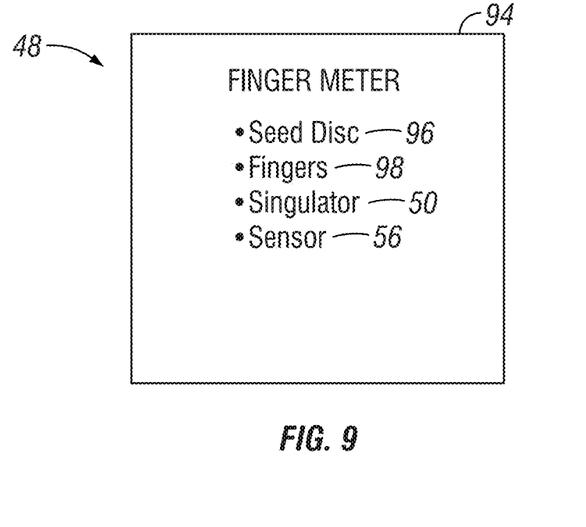
FIG. 9 is a diagram of an exemplary finger meter style seed meter.

FIG. 9 is yet another embodiment of a metering member 48 and is shown as a finger meter 94. The finger meter includes a finger wheel 96 with a plurality of radially spaced fingers 98. The fingers are used to mechanically hold a seed thereat until a location to which the fingers open to release said seed. Therefore, the electric motor can control the population of seed being dispensed thereof, such as by controlling how fast the seed is being released from the meters as the finger assembly rotates in a meter housing.

Therefore, an electrically controlled seed meter at each row unit of a seed drill has been shown and described and will provide numerous advantages over traditional seed drills. As has been stated, the rotational meter speed can set the dispersion rate of each seed meter at each of the row units. The use of a sensor, such as an optical sensor can be used to measure the flow rate to measure the rate of population, which allows for monitoring the system. The advantages are numerous and can include, but are not limited to, the consistent row-to-row population control of planting, the limitation of effect on population due to changes and field conditions including changes in elevation, swath control of planting, singulation of crops, which is not based on volumetric singulation, row-by-row seed censoring at the opener, turning compensation control, row-by-row variable rate population control of planting, consistent seed delivery, and even seed distribution in a row. As mentioned, these are but a few of the advantages of the system and are not to be limiting thereto.

Furthermore, it should be appreciated that, while certain exemplary embodiments have been shown and described herein, there are not to be limiting to the invention. For example, while an air seed delivery system has been shown and described, it is to be also contemplated that daisy chaining of row units to receive seed from a seed source can be utilized to provide the on-demand seed required for planting utilizing the seed metering and delivery system as shown and described herein. Additionally, while the turn seed drills have been utilized to describe the implements of the system, this is also not to be limiting. The implement can generally be any type of implement in which it may be desirable to plant a seed or other crop. This can include traditional planters, tillage equipment, spraying equipment, and/or generally any other type of implement that may include a mounting member for mounting a seed meter and row unit as shown and described herein. Additionally, while certain types of meters have been shown and described, it is to be appreciated that generally any type of electrically controllable metering system to aid in the population control and dispensement of seed therefrom can be utilized with the metering system and will be an improvement over that currently known. Other variations that are obvious to those skilled in the art are contemplated and considered to be part of the present disclosure.

From the foregoing, it can be seen that the present invention accomplishes at least all of the stated objectives. Additional advantages of such novel aspects of the present disclosure should be readily apparent to those skilled in the art and any obvious variation to that described herein are shown in the figures of the present disclosure should be considered as part of the disclosure.

What is claimed is:

1. A metering system for use with a seed drill, the metering system comprising:
    a seed meter comprising a housing and a metering member within the housing, the housing comprising a seed chute;
    an electric motor operatively connected to the seed meter to rotate the metering member within the seed meter housing;
    a seed sensor positioned at the seed chute of the housing to monitor movement of seed therein; and
    a seed shoe operatively connected to the seed meter housing for creating a furrow in which seed from the seed meter is directed for planting.

2. The metering system of claim 1, further comprising a singulation member in the seed meter housing and positioned to singulate seed associated with a seed disk of the metering member.

3. The metering system of claim 1, wherein the metering member comprises:
    a. a brush meter;
    b. a vacuum meter;
    c. a positive pressure meter; or
    d. a finger meter.

4. The metering system of claim 3, wherein the brush meter comprises a seed disk with a plurality of seed pockets, an upper brush to singulate seed in the pocket, a lower brush, and a wear band.

5. The metering system of claim 3, wherein the vacuum meter comprises a seed disk with a plurality of seed cells and a vacuum source to provide a pressure differential at the plurality of seed cells to at least temporarily adhere seed thereto.

6. The metering system of claim 3, wherein the positive pressure meter comprises a seed disk with a plurality of seed cells and an air source to provide a pressure differential at the plurality of seed cells to at least temporarily adhere seed thereto.

7. The metering system of claim 3, wherein the finger meter comprises a seed disk and a plurality of mechanically activated fingers attached thereto, wherein the fingers are used to temporarily hold seed until release via the seed chute.

8. A seed drill planter, comprising:
    at least one toolbar;
    a plurality of row units spaced along the at least one toolbar, each of the plurality of row units comprising a metering member operated by an electric motor, the metering member used to singulate and dispense seed, and a seed sensor that monitors the movement of seeds dispensed by the metering member;
    a seed source, the seed source connected to each of the row units to provide seed to the metering members.

9. The seed drill planter of claim 8, wherein each of the row units further comprise a furrow opener for opening a furrow to receive the dispensed seed, and a furrow closer to close the furrow after the seed is positioned therein.

10. The seed drill planter of claim 9, wherein each of the row units further comprise a seed tube connected to a seed chute of the metering member, wherein seed is passed from the seed chute to the seed tube and towards the furrow.

11. The seed drill planter of claim 10, wherein each of the row units further comprise a seed shoe.

12. The seed drill planter of claim 8, further comprising an air seed delivery system to deliver seed from the seed source to each of the plurality of row units.

13. The seed drill planter of claim 8, wherein the plurality of row units are positioned adjacent tillage members that are spaced on the at least one toolbar.

14. The metering system of claim 8, wherein the metering member comprises:
    a. a brush meter;
    b. a vacuum meter;
    c. a positive pressure meter; or
    d. a finger meter.

15. The metering system of claim 14, wherein the brush meter comprises a seed disk with a plurality of seed pockets, an upper brush to singulate seed in the pocket, a lower brush, and a wear band.

16. The metering system of claim 14, wherein the vacuum meter comprises a seed disk with a plurality of seed cells and a vacuum source to provide a pressure differential at the plurality of seed cells to at least temporarily adhere seed thereto.

17. The metering system of claim 14, wherein the positive pressure meter comprises a seed disk with a plurality of seed cells and an air source to provide a pressure differential at the plurality of seed cells to at least temporarily adhere seed thereto.

18. The metering system of claim 14, wherein the finger meter comprises a seed disk and a plurality of mechanically activated fingers attached thereto, wherein the fingers are used to temporarily hold seed until release via the seed chute.

19. An agricultural planting implement, comprising:
   a toolbar;
   a plurality of seed meters positioned along the length of the toolbar, the seed meters electrically driven and including a housing, a singulator, and a seed sensor that monitors the movement of seeds dispensed by the seed meter; and
   a seed cart in fluid connection with each of the plurality of seed meters, wherein the seed cart provides an on-demand supply of seed to be planted by each of the seed meters.

20. The agricultural planting implement of claim 19, further comprising:
   a seed shoe operatively connected to the seed meter housing for creating a furrow in which seed from the seed meter is directed for planting; and
   a seed tube connected to a seed chute of the metering member, wherein seed is passed from the seed chute to the seed tube and towards the furrow.

\* \* \* \* \*